(12) United States Patent
Sweet

(10) Patent No.: US 8,655,508 B2
(45) Date of Patent: Feb. 18, 2014

(54) AIRCRAFT ENVIRONMENTAL THREAT DETECTION AND MITIGATION

(75) Inventor: David H. Sweet, Jupiter, FL (US)

(73) Assignee: Sikorsky Aircraft Corporation, Stratford, CT (US)

( * ) Notice: Subject to any disclaimer, the term of this patent is extended or adjusted under 35 U.S.C. 154(b) by 264 days.

(21) Appl. No.: 13/152,430

(22) Filed: Jun. 3, 2011

(65) Prior Publication Data

US 2012/0310448 A1    Dec. 6, 2012

(51) Int. Cl.
*G01C 23/00*    (2006.01)
(52) U.S. Cl.
USPC .................................................. 701/3; 244/54
(58) Field of Classification Search
USPC ........... 701/3; 244/538, 3.16, 54, 135 R, 195, 244/17.13, 53 R; 95/267, 273
See application file for complete search history.

(56) References Cited

U.S. PATENT DOCUMENTS

| | | | |
|---|---|---|---|
| 5,894,987 A | 4/1999 | Layne et al. | |
| 7,003,426 B2 | 2/2006 | Bonanni et al. | |
| 7,561,067 B2 * | 7/2009 | Matayoshi et al. | 340/973 |
| 7,857,257 B2 * | 12/2010 | Schwarz | 244/53 B |
| 2010/0004803 A1 | 1/2010 | Manfredi et al. | |

* cited by examiner

*Primary Examiner* — Thomas Black
*Assistant Examiner* — Luke Huynh
(74) *Attorney, Agent, or Firm* — Cantor Colburn LLP

(57) ABSTRACT

A method of aircraft engine thermal threat mitigation includes detecting an airflow thermal profile at a location on the aircraft forward of an aircraft engine inlet and transmitting the thermal profile to an aircraft control system. The thermal profile is compared to a catalog of thermal threat profiles at the aircraft control system and a determination is made if a thermal threat is present based on the comparison. A thermal threat mitigation measure is initiated to reduce an effect of the thermal threat on aircraft engine performance.

15 Claims, 4 Drawing Sheets

AIRCRAFT ENVIRONMENTAL THREAT DETECTION AND MITIGATION

BACKGROUND OF THE INVENTION

The subject matter disclosed herein relates to aircraft and engine control systems. More specifically, the subject disclosure relates to aircraft and engine control systems for air intake threat detection and mitigation.

Modern aircraft, including fixed wing and rotary wing aircraft, employ full authority digital engine control (FADEC) systems for engine management. These systems typically include two or more fully redundant and independent control channels, and have no manual backup engine control capability to be employed in the event of full FADEC failure. In addition, the engines often utilize highly reactive inlet guide vanes (IGV's) disposed at or near the engine inlet to control and manage airflow into the engine compressor section. The IGV's are positioned and repositioned throughout the flight envelope to attempt to balance aircraft and engine performance requirements such as power and specific fuel consumption with operability requirements such as surge margin. These requirements are often at odds with each other, making control of the air intake flow critical.

From recent field and flight test experience, it has become known that these engine systems are very sensitive to sudden and dynamic changes in temperature of airflow entering the engine via the air intake. Typically, a temperature sensor located in the inlet of the engine is utilized by the FADEC system to ascertain the temperature of the incoming airflow and manage engine systems, such as the IGV accordingly. When this sensor, however, cannot provide data to the FADEC system quickly enough in cases of rapidly changing inlet temperature, the controls set by the FADEC will be in error, potentially resulting in significant power loss and/or engine stall. Such stall condition may persist for as long as the adverse thermal condition (or thermal threat) is present and may ultimately result in engine damage or flameout. Further, a significant thermal threat can affect all of the intakes of multi-engine aircraft simultaneously.

BRIEF DESCRIPTION OF THE INVENTION

According to one aspect of the invention, a method of aircraft environmental threat mitigation includes detecting an airflow profile at a location forward of the aircraft and transmitting the airflow profile to an aircraft control system. The airflow profile is compared to a catalog of environmental threat profiles at the aircraft control system and it is determined if an environmental threat is present based on the comparison. An environmental threat mitigation measure is initiated to reduce an effect of the environmental threat on aircraft performance.

According to another aspect of the invention, an aircraft engine environmental threat detection and mitigation system includes one or more environmental sensors located to detect an airflow profile substantially forward of the aircraft and an aircraft control system in operable communication with the one or more environmental sensors. The system further includes a catalog of environmental threat profiles at the aircraft control system to which the airflow profile is compared, and one or more mitigation means in operable communication with the aircraft control system. The one or more mitigation means are activated when the aircraft control system determines the presence of an environmental threat.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
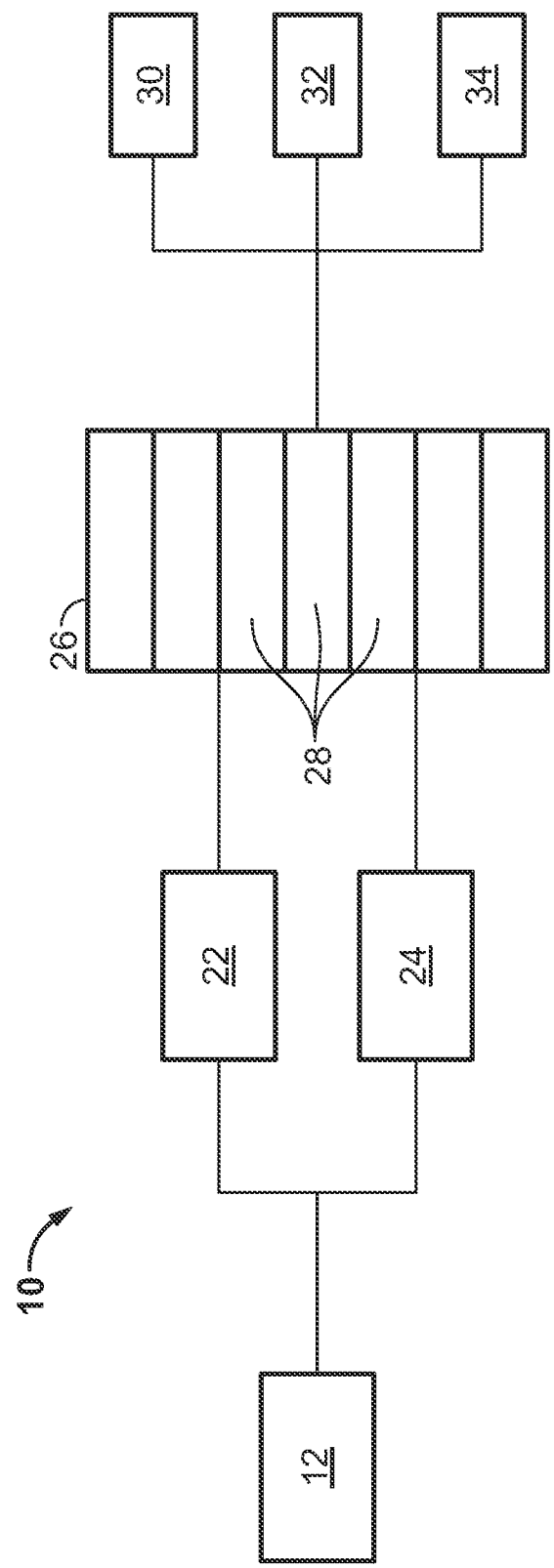
FIG. 1 is a schematic flow diagram of an embodiment of an aircraft engine thermal threat mitigation system.
Figure 2:
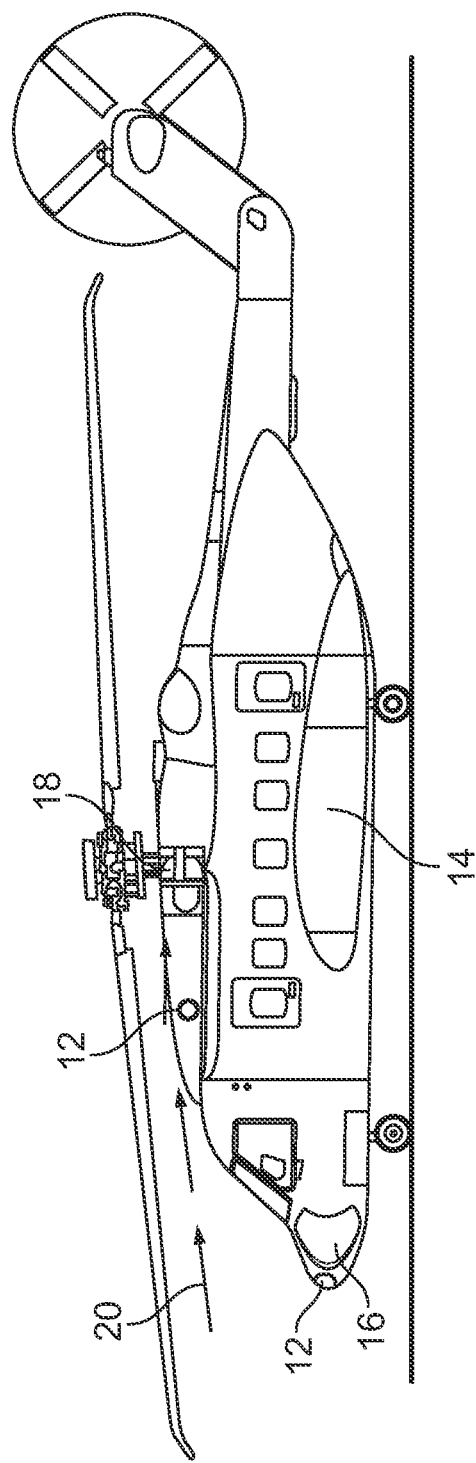
FIG. 2 is a schematic plan view of an embodiment of an aircraft.

Shown in FIG. 1 is a schematic flow diagram of an environmental threat recognition and mitigation system 10. The system 10 recognizes environmental threats which may include thermal threats (sudden, dynamic temperature changes), and other environmental threats such as sand, dust, or other airborne debris, chemical threats, and/or radiation. The system 10 includes one or more leading indicators, or sensors 12, to detect the particular environmental threat, as shown in FIG. 2. For example temperature sensors are utilized to detect thermal threats. The one or more sensors 12 are located on an aircraft 14, for example, a helicopter as shown, or a fixed wing aircraft. The sensors 12 are located on the aircraft 14 at one or more selected locations, for example, at a nose 16 or forward of an engine inlet 18 of the aircraft 14. In some embodiments, it is desired to position the temperature sensors 12 as far forward on the aircraft 14 as possible, to detect the environmental threat as far forward of the aircraft 14 as possible, for example, before a thermal threat reaches the engine inlet 18. In still other embodiments, the sensors 12 may be located remotely, separate from the aircraft 14, and may be ground sensors, satellite sensors or sensors located on pathfinder aircraft which sense the environmental threat and broadcast the condition to the aircraft 14. In some embodiments, the sensors 12 are high response thermal probes with high sensitivity to changes in temperature of airflow 20 forward of the engine inlet 18.

Referring again to FIG. 1, in the particular case of sensing and mitigating thermal threats, the sensors 12 continuously collect data regarding the temperature of the airflow 20. The data is fed to control systems on board the aircraft 14, for example the airframe control system 22 and/or the full authority digital engine control (FADEC) 24. The airframe control system 22 and/or the FADEC 24 apply signal conditioning to shape and amplify the data. Such data shaping and amplification is necessary due to the rapidly changing characteristics of the airflow 20 as it approaches the engine inlet 18. Signal shaping and amplification of data collected by sensors 12 is required in order to generate the longest lead time necessary to activate mitigation corrections before the rapidly approaching thermal threat can cause engine upset, damage, or flame-out.

The shaped data is then compared to a catalog 26 of threat profiles 28 which are programmed into the airframe control system 22 and/or the FADEC 24. These threat profiles may include, but are not limited to, rocket fire, gun fire, severe terrain fires, exhaust plumes and the like. The identified threat may be broadcast back to cockpit displays and warning systems to ensure total situational awareness. Generally, thermal threats are defined by localized high rate of change in temperature of the airflow 20. Such high rates of change in airflow 20 temperature that, unless mitigated, negatively affects performance of the aircraft engine resulting, in some instances, in stall of the engine and/or damage thereto.

Figure 3:
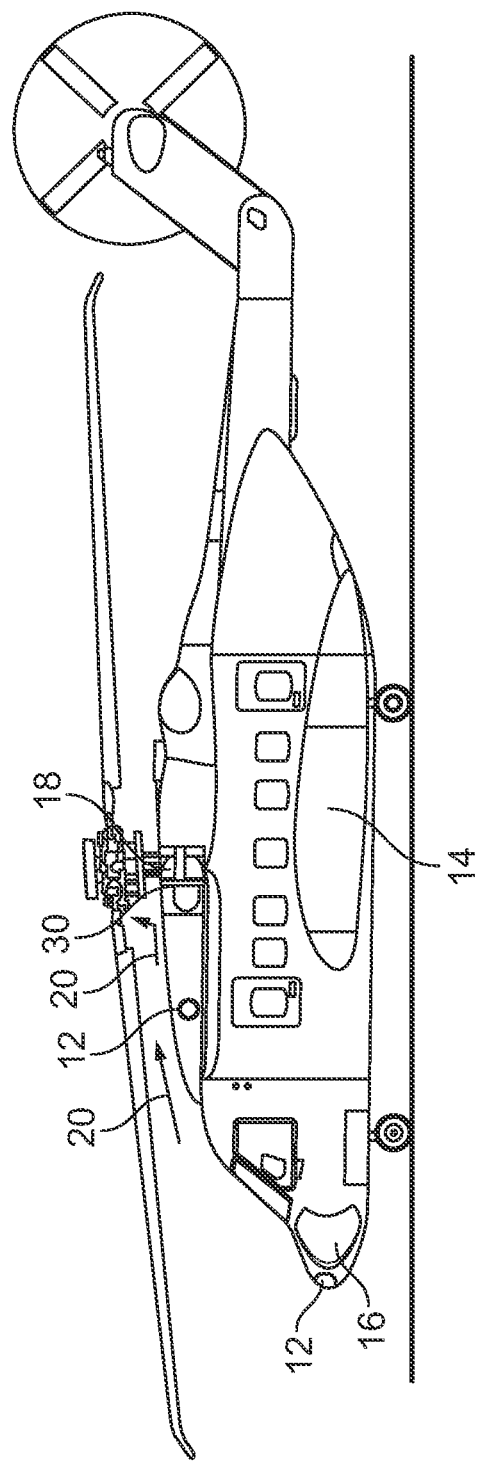
FIG. 3 is a schematic of an embodiment of a thermal threat mitigation measure.

When the shaped data is determined by the airframe control system 22 and/or the FADEC 24 to match a thermal threat profile 28, the airframe control system 22 and/or the FADEC 24 signal for action to be taken to mitigate the thermal threat profile 28. For example, in some embodiments, as shown in FIG. 3, the airframe control system 22 closes an airframe engine intake door 30, to prevent ingestion of the thermal threat airflow into the engine inlet 18. When the airframe control system 22 determines that the thermal threat has subsided, the airframe engine intake door 30 is reopened. In addition, the mitigation employed would be displayed to the pilot and would refresh dependent on the actions taken by the threat mitigation system 10.

Figure 4:
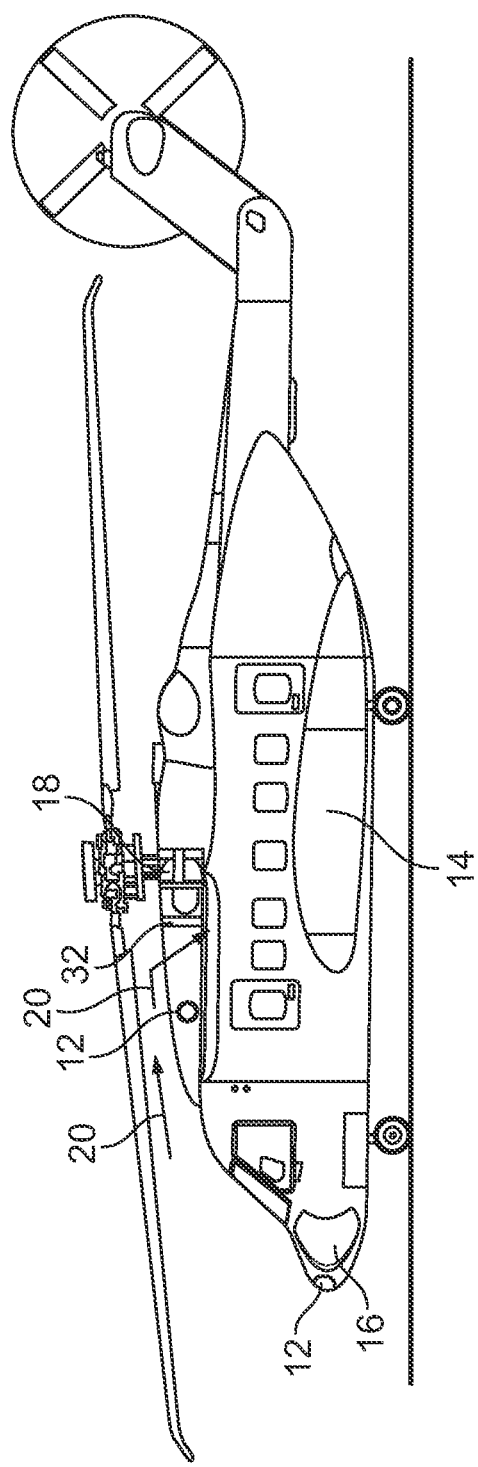
FIG. 4 is a schematic of another embodiment of a thermal threat mitigation measure.

Referring to FIG. 4, in other embodiments, the airframe control system 22 may extend a line of sight air dam 32 forward of the engine intake 18 to divert airflow 20 around the open engine inlet 18. Similarly, when the airframe control system 22 determines that the thermal threat has passed, the air dam 32 is stowed.

In other embodiments, the FADEC 24 configures inlet guide vane (IGV) 34 settings to a more closed position in the event of an indication of a thermal threat, thus allowing the engine to tolerate the rapidly changing airflow 20 density accompanying the thermal threat. In some embodiments, the IGV's 34 or air dam 32 may be continually adjusted based on continued sensing of the thermal conditions of the airflow 20, with the degree of thermal threat determining the degree of mitigation.

In some embodiments, the system 10 incorporates fault detection and accommodation (FDA) logic to ensure accuracy of the sensed environmental data and would apply temperature sensor 12 redundancy. Further, in some embodiments, failure modes and pilot overrides are utilized in the case of, for example, engine failure or failure-of, or damage-to, the thermal threat and mitigation system 10 itself Further, pilot overrides may be employed to deactivate the mitigation measures in the event that the pilot has a demand for all maximum available power of the engine regardless of the threat encountered.

While the above description was directed mainly toward sensing and mitigation of thermal threats to the aircraft 14, it will be appreciated that the above described system 10 may be similarly utilized to recognize and mitigate other environmental threats such as such as sand, dust, or other airborne debris, chemical threats, and/or radiation.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of aircraft environmental threat mitigation comprising:
    detecting an airflow profile at a location forward of the aircraft;
    transmitting the airflow profile to an aircraft control system;
    comparing the airflow profile to a catalog of environmental threat profiles at the aircraft control system;
    determining if an environmental threat is present based on the comparison; and
    initiating an environmental threat mitigation measure to reduce an effect of the environmental threat on aircraft performance.

2. The method of claim 1, further comprising amplifying the characteristics of the airflow profiles transmitted to the aircraft control system in order to maximize recognition, threat classification, and mitigation potential.

3. The method of claim 1, wherein the airflow profile is an airflow thermal profile.

4. The method of claim 3, further comprising transmitting the airflow thermal profile to an airframe control system.

5. The method of claim 4, further comprising closing an aircraft engine intake door, thereby preventing ingestion of the environmental threat into the aircraft engine.

6. The method of claim 4, further comprising extending an air dam forward of the aircraft engine inlet thereby diverting the environmental threat around the aircraft engine inlet.

7. The method of claim 3, further comprising transmitting the airflow thermal profile to a full authority digital engine control system.

8. A method of aircraft environmental threat mitigation comprising:
    detecting an airflow profile at a location forward of the aircraft, the airflow profile an airflow thermal profile;
    transmitting the airflow profile to an aircraft control system;
    comparing the airflow profile to a catalog of environmental threat profiles at the aircraft control system;
    determining if an environmental threat is present based on the comparison;
    initiating an environmental threat mitigation measure to reduce an effect of the environmental threat on aircraft performance;
    transmitting the airflow thermal profile to a full authority digital engine control system; and
    closing a plurality of inlet guide vanes at the aircraft engine to mitigate the changes in airflow density due to the airflow thermal profile.

9. The method of claim 1, further comprising:
    continually monitoring the presence of the environmental threat profile; and
    halting the mitigation measure when it is determined that the environmental thermal threat has subsided.

10. An aircraft engine environmental threat detection and mitigation system comprising:
    one or more environmental sensors disposed configured to detect an airflow profile substantially forward of the aircraft;
    an aircraft control system in operable communication with the one or more environmental sensors;
    a catalog of environmental threat profiles at the aircraft control system to which the airflow profile is compared; and one or more mitigation means in operable communication with the aircraft control system, the one or more mitigation means activated when the aircraft control system determines the presence of an environmental threat.

11. The system of claim 10, wherein the aircraft control system is an airframe control system.

12. The system of claim 11, wherein the mitigation means is an aircraft engine intake door.

13. The system of claim 11, wherein the mitigation means is an air dam forward of the aircraft engine inlet.

14. The system of claim 10, wherein the aircraft control system is a full authority digital engine control system.

15. The system of claim 14, wherein the mitigation means is a plurality of inlet guide vanes at the aircraft engine.

* * * * *